US009010292B2

(12) United States Patent
Herden

(10) Patent No.: US 9,010,292 B2
(45) Date of Patent: Apr. 21, 2015

(54) LASER SPARK PLUG AND PRECHAMBER MODULE FOR SAME

(75) Inventor: Werner Herden, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 447 days.

(21) Appl. No.: 13/147,989

(22) PCT Filed: Feb. 1, 2010

(86) PCT No.: PCT/EP2010/051164
§ 371 (c)(1),
(2), (4) Date: Sep. 6, 2011

(87) PCT Pub. No.: WO2010/094552
PCT Pub. Date: Aug. 26, 2010

(65) Prior Publication Data
US 2011/0308489 A1 Dec. 22, 2011

(30) Foreign Application Priority Data

Feb. 18, 2009 (DE) .......................... 10 2009 000 956

(51) Int. Cl.
| F02B 19/00 | (2006.01) |
| F02P 23/00 | (2006.01) |
| F02P 23/04 | (2006.01) |
| F02B 19/12 | (2006.01) |
| F02B 19/18 | (2006.01) |
| F02P 13/00 | (2006.01) |

(52) U.S. Cl.
CPC ................. *F02P 23/04* (2013.01); *F02B 19/12* (2013.01); *F02B 19/18* (2013.01); *F02P 13/00* (2013.01); *Y02T 10/125* (2013.01)

(58) Field of Classification Search
CPC ...... F02B 19/08; F02B 19/10; F02B 19/1004; F02B 19/1061; F23Q 13/005
USPC .......... 123/143 B, 145 A, 145 R, 147 B, 260, 123/262, 263, 266, 273, 280
See application file for complete search history.

(56) References Cited

U.S. PATENT DOCUMENTS

| 2,026,822 | A | * | 1/1936 | Close ........................... 313/11.5 |
| 2,057,390 | A | * | 10/1936 | Metailler ........................ 138/37 |
| 3,861,371 | A | * | 1/1975 | Gamell ..................... 123/143 B |
| 4,416,226 | A | * | 11/1983 | Nishida et al. ............ 123/143 B |
| 4,434,753 | A | | 3/1984 | Mukainakano et al. |
| 4,452,189 | A | | 6/1984 | Latsch et al. |

(Continued)

FOREIGN PATENT DOCUMENTS

| DE | 102006018973 | 10/2007 |
| DE | 102007015036 | 10/2008 |

(Continued)

OTHER PUBLICATIONS

International Search Report, PCT International Patent Application No. PCT/EP2010/051164, dated May 11, 2010.

*Primary Examiner* — Hieu T Vo
*Assistant Examiner* — Sherman Manley
(74) *Attorney, Agent, or Firm* — Kenyon & Kenyon LLP

(57) ABSTRACT

A laser spark plug, in particular for an internal combustion engine of a motor vehicle, is described. A connection arrangement is provided in an end region of the laser spark plug facing the combustion chamber. The connection arrangement allow the laser spark plug to be connected to a prechamber module.

20 Claims, 3 Drawing Sheets

(56) References Cited

U.S. PATENT DOCUMENTS

| | | | |
|---|---|---|---|
| 4,852,529 A * | 8/1989 | Vowles | 123/143 B |
| 4,963,112 A * | 10/1990 | Benedikt et al. | 445/7 |
| 5,756,924 A * | 5/1998 | Early | 102/201 |
| 5,983,871 A * | 11/1999 | Gordon et al. | 123/536 |
| 7,104,246 B1 * | 9/2006 | Gagliano et al. | 123/266 |
| 7,499,477 B2 * | 3/2009 | Winklhofer et al. | 372/10 |
| 7,765,980 B2 * | 8/2010 | Vogel et al. | 123/305 |
| 7,806,094 B2 * | 10/2010 | Gruber | 123/143 B |
| 2005/0268882 A1 | 12/2005 | Robinet et al. | |
| 2007/0064746 A1 * | 3/2007 | Winklhofer et al. | 372/10 |
| 2009/0107436 A1 * | 4/2009 | Schultz | 123/143 B |
| 2009/0159031 A1 * | 6/2009 | Gruber | 123/143 B |
| 2009/0159033 A1 * | 6/2009 | Steigleman et al. | 123/143 B |
| 2010/0147259 A1 | 6/2010 | Kuhnert et al. | |
| 2012/0037108 A1 * | 2/2012 | Herden et al. | 123/143 B |

FOREIGN PATENT DOCUMENTS

| | | |
|---|---|---|
| FR | 2 873 763 | 2/2006 |
| FR | 2873763 | 2/2006 |
| JP | 55-88074 | 12/1953 |
| JP | 55-1401 | 1/1980 |
| JP | 55-102075 | 7/1980 |
| JP | 3-172504 | 7/1991 |
| JP | 2000-133411 | 5/2000 |
| JP | 2006-59588 | 3/2006 |
| JP | 2006-329116 | 12/2006 |
| WO | WO 2007/092972 | 8/2007 |

* cited by examiner

LASER SPARK PLUG AND PRECHAMBER MODULE FOR SAME

FIELD OF THE INVENTION

The present invention relates to a laser spark plug, in particular for an internal combustion engine of a motor vehicle.

BACKGROUND INFORMATION

Such a laser spark plug is described in German Patent Application No. DE 10 2006 018 973 A1, for example. The conventional laser spark plug has an integrated prechamber system in which the prechamber is designed as one piece with the housing of the laser spark plug. It is disadvantageous that the entire laser spark plug together with the integrated prechamber must always be replaced when only one component of the conventional system no longer functions. In particular when used in large stationary gas engines, due to deposits and other wear the service life of the prechamber may be shorter than that of the laser components which are likewise integrated into the laser spark plug. In such cases, in the conventional system a laser system, still functional as such, together with the worn-out integrated prechamber system must be replaced and disposed of, which is not economical in particular due to the much higher manufacturing costs of the laser system with regard to the prechamber components.

SUMMARY

An object of the present invention is to improve a laser spark plug of the aforementioned type in such a way that more flexible use is possible, and at the same time the disadvantages of the conventional systems are avoided.

In a laser spark plug of the aforementioned type, this object may be achieved according to an example embodiment of the present invention by providing a connection arrangement in an end region of the laser spark plug facing the combustion chamber, the connection arrangement allowing the laser spark plug to be connected to a prechamber module.

The design of the example laser spark plug according to the present invention allows a separate prechamber module to be provided, and by use of the connection means according to the present invention it is also advantageously possible to connect the prechamber module to the laser spark plug in a comparatively late manufacturing stage.

A greater degree of freedom is provided in the manufacture of spark plugs having prechambers, since, for example, different types of prechamber modules may be connected to the laser spark plug according to the present invention. Such connections may have a detachable or a nondetachable design.

However, in one particularly preferred specific embodiment of the laser spark plug according to the present invention, the connection arrangement is designed in such a way that it allows a detachable connection of the laser spark plug to the prechamber module. In this case, the prechamber module may advantageously be connected to the laser spark plug, also after completion of a manufacturing process for the laser spark plug, and if necessary may be separated again from the laser spark plug. When the prechamber module reaches a wear threshold, it is thus possible in particular to separate the prechamber module from the laser spark plug in a nondestructive manner, and only dispose of the prechamber module. The still functional laser spark plug together with its laser system may advantageously continue to be used, and for this purpose, for example, connected to a new prechamber module via the connection arrangement according to the present invention.

Such a replacement of the prechamber module may easily be carried out during a customary maintenance operation for the laser spark plug or an internal combustion engine which contains the laser spark plug, using the connection arrangement according to the present invention.

In another very advantageous specific embodiment of the laser spark plug according to the present invention, the connection arrangement is designed in such a way that it allows a screw connection and/or a press fit and/or a snap-on connection of the laser spark plug to the prechamber module, which allows the prechamber module to be replaced in a particularly simple manner.

In another advantageous specific embodiment of the present invention, a particularly stable mechanical connection between the laser spark plug and the replaceable prechamber module is provided, in that the connection arrangement has a preferably tubular fixing section which extends essentially coaxially to a longitudinal axis of the laser spark plug and which is preferably designed as one piece with a housing of the laser spark plug.

The fixing section may have an internal thread and/or an external thread, for example, so that the prechamber module may either be situated within the fixing section or screwed over the fixing section of the laser spark plug in the manner of a union connection.

It is also possible to provide multiple prechamber modules at the same time, a first prechamber module of which is situated in the tubular fixing section with the aid of the internal thread of the fixing section, for example, and a second prechamber module of which is screwed as a union connection onto the external thread of the fixing section. A multi-stage prechamber system may be achieved in this way.

Alternatively or in addition to the fixing of a prechamber module, an optical component, for example, such as a combustion chamber window or a focusing lens, may also be screwed into the tubular fixing section, provided that it has an appropriate connection arrangement which cooperates with the connection arrangement of the laser spark plug.

Another example the prechamber module according to the present invention for a laser spark plug has a connection arrangement which is designed to cooperate with the connection arrangement of the laser spark plug. The connection arrangement may in particular be an internal or external thread, and/or arrangement for establishing a press fit and/or a snap-on connection.

In another preferred specific embodiment of the prechamber module according to the present invention, the prechamber module contains a material having high thermal conductivity, in particular brass. Alternatively or additionally, a composite material which contains copper and steel, for example, may be provided. A homogeneous design of the prechamber module made of one of the above-mentioned materials is also possible. The selection of material according to the present invention for the prechamber module advantageously results in improved heat dissipation and heat distribution, so that in particular the surface temperature of the prechamber module on the combustion chamber side is lowered, thus reducing the risk of uncontrolled pre-ignitions.

According to another variant of the present invention, particularly simple installation or replacement of the prechamber module according to the present invention is possible due to the fact that the prechamber module has an entrainment profile, in particular a hexagonal profile, which is preferably provided on the exterior.

The entrainment profile may preferably be situated in an end region of the prechamber module facing the combustion chamber.

In another very advantageous specific embodiment of the prechamber module according to the present invention, at least one overflow passage is provided which allows a fluid connection between an inner region and an outer region of the prechamber module.

Alternatively or in addition to the overflow passages, which are usually implemented by boreholes, the prechamber module according to the present invention may have further openings which allow fluid exchange between the interior of the prechamber module and a combustion chamber of an internal combustion engine which encloses the prechamber module.

The prechamber module according to the present invention may also advantageously have an integrated optical component, for example a combustion chamber window which is designed as a sacrificial window. Thus, due to the ease of replacing the prechamber module, a "spent" sacrificial window for the laser spark plug may also be easily replaced, in particular without having to replace the components which are permanently integrated into the laser spark plug. In addition, the replaceable sacrificial window provides increased protection of the primary combustion chamber window, which is permanently integrated into the laser spark plug.

Another very advantageous specific embodiment of the present invention provides that at least one optical component, in particular a combustion chamber window, may be situated in the region of the connection arrangement between the prechamber module and the end region of the laser spark plug facing the combustion chamber, and is fixable with respect to the laser spark plug with the aid of the prechamber module. In this case, the replaceable prechamber module according to the present invention is used at the same time as an installation means for mounting the optical component. In this variant of the present invention, seals and suitable mountings for accommodating the optical component in the region of the connection arrangement, for example sealing rings, may be provided for securely supporting the optical component.

Further advantages, features, and particulars result from the following description, in which various exemplary embodiments of the present invention are illustrated with reference to the figures. Features mentioned in the description may in each case be used alone or in any given combination in accordance with the present invention.

BRIEF DESCRIPTION OF THE DRAWINGS

FIG. 4b shows a top view of the prechamber module according to FIG. 4a.

DETAILED DESCRIPTION OF EXAMPLE EMBODIMENTS

Figure 1:
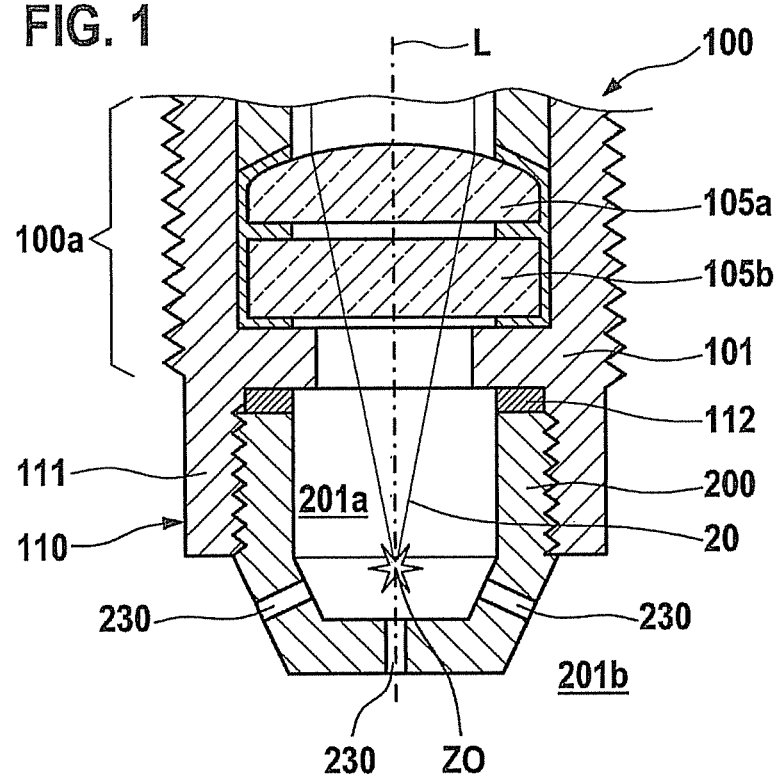
FIG. 1 shows a partial cross section of a first specific embodiment of the laser spark plug according to the present invention, together with a prechamber module according to the present invention.

FIG. 1 shows a partial cross section of a laser spark plug 100 according to the present invention, of which generally only end region 100a thereof facing the combustion chamber is illustrated. Laser spark plug 100 is screwed into a cylinder head of an internal combustion engine in a conventional manner.

Laser spark plug 100 has a laser device, not illustrated, which provides high-energy laser pulses 20, which are focused on an ignition site ZO via a focusing lens 105a and are uncoupled from laser spark plug 100 via a combustion chamber window 105b in the optical path downstream from focusing lens 105a.

To implement a prechamber system, laser spark plug 100 according to the present invention has a prechamber module 200, illustrated in FIG. 1. In contrast to conventional laser spark plugs having a prechamber system, prechamber module 200 is designed as a separate component, and it is thus possible to connect the prechamber module to laser spark plug 100 after the laser spark plug is manufactured.

It is thus advantageously possible to selectively connect different types of prechamber modules 200 to a given laser spark plug 100.

The connection between laser spark plug 100 and prechamber module 200 particularly preferably has a detachable design, which is achieved according to the present invention using an appropriate connection arrangement 110.

In the present case, connection arrangement 110 of the laser spark plug according to the present invention 100 is designed in such a way that it establishes a screw connection. For this purpose, connection arrangement 110 has a preferably tubular fixing section 111 which extends generally coaxially to longitudinal axis L of laser spark plug 100 and which is preferably designed as one piece with remaining housing 101 of laser spark plug 100.

Prechamber module 200 has a connection arrangement, in the present case an external thread, which is complementary to connection means 110 of laser spark plug 100, so that prechamber module 200 may be easily screwed into laser spark plug 100 and out of laser spark plug 100.

Prechamber module 200 may thus be individually replaced during a maintenance operation for laser spark plug 100 without having to replace entire laser spark plug 100, including the comparatively expensive laser system, at the same time. Due to this ease of replacement of prechamber module 200, the present invention is particularly suited for use in large stationary gas engines, since in this field of application the prechambers generally have a shorter service life than the remaining components of the laser spark plug.

In addition, laser spark plug 100 may be flexibly adapted to different operating conditions due to the ease of replacement of prechamber module 200 which is possible according to the present invention. For example, depending on the heat of combustion of a gas to be ignited, etc., in each case a prechamber module 200 which is optimized for this purpose may be selected and connected to laser spark plug 100. Prechamber modules 200 may, for example, differ with respect to their geometry, and/or the geometry and quantity of their overflow passages 230, via which the propagation of ignition flaring from prechamber 201a into combustion chamber 201b may be adjusted. In this way, laser spark plug 100, i.e., prechamber module 200, may be optimally adapted to the type of fuel or gas used.

In the specific embodiment according to FIG. 1, prechamber module 200 is screwed via its external thread into the internal thread of fixing region 111, resulting in a detachable form-locked connection. In addition, a sealing arrangement 112 for sealing resulting prechamber 201a is provided.

Figure 2:
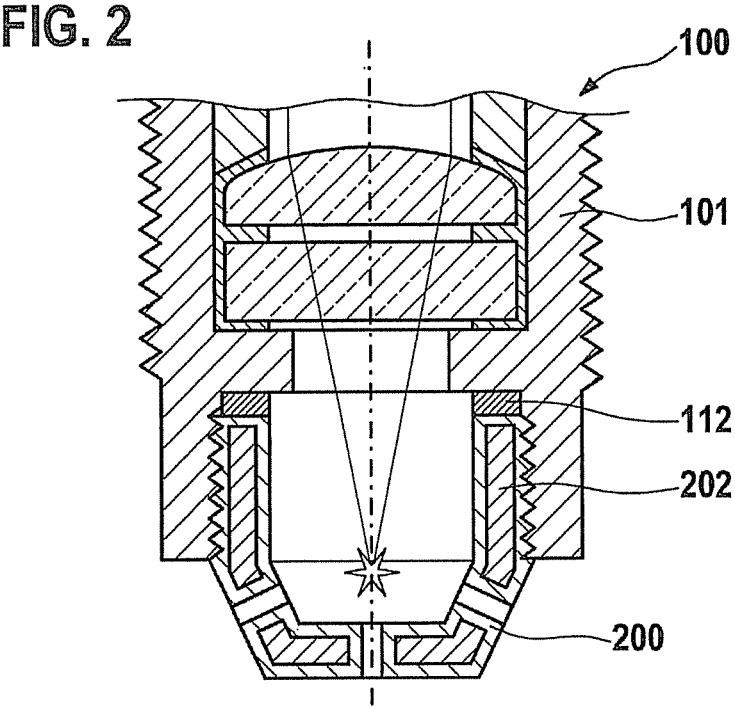
FIG. 2 shows another specific embodiment of a prechamber module according to the present invention which is connected to a laser spark plug.

FIG. 2 shows another specific embodiment of laser spark plug 100 according to the present invention, in which prechamber module 200 according to the present invention contains a composite material made of steel and copper. As is apparent from FIG. 2, significant portions 202 of prechamber module 200 are made of a copper composite material, resulting in optimized thermal conduction in prechamber module 200. In particular, the problem that the surface of prechamber module 200 on the combustion chamber side may heat up too intensely and result in pre-ignitions is thus avoided.

Figure 3:
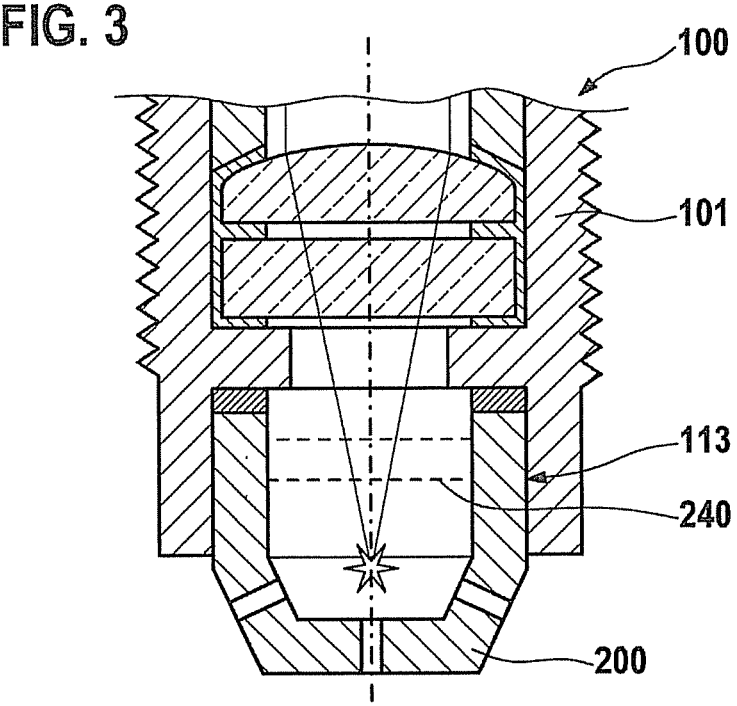
FIG. 3 shows another specific embodiment of the present invention.

FIG. 3 shows another specific embodiment of the laser spark plug 100 according to the present invention, in which prechamber module 200 is connected to laser spark plug 100 via a detachable press fit 113. Detachable press fit 113 may be implemented, for example, by using different materials for housing 101 of laser spark plug 100 and for prechamber module 200.

Prechamber module 200 according to the present invention may advantageously also have an integrated optical component 240, which in the present case is indicated by the dashed-line rectangle in FIG. 3 and which is designed as an additional combustion chamber window, for example.

In the configuration of prechamber module 200 and mounting thereof on laser spark plug 100, it should generally be aimed for that ignition site ZO (FIG. 1) is situated in a region in which only small currents prevail to allow reliable laser ignition even for lean mixtures.

In addition, in such a configuration, ignition may be successfully carried out using relatively little laser energy, thus reducing the complexity and costs of the laser device.

Figure 4A:
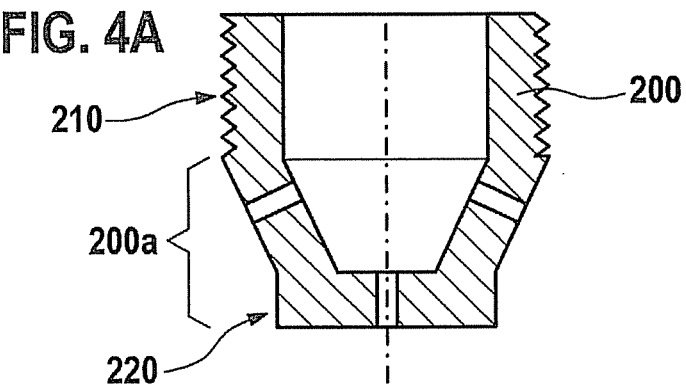
FIG. 4a shows a partial cross section of another specific embodiment of the prechamber module according to the present invention.
Figure 4B:
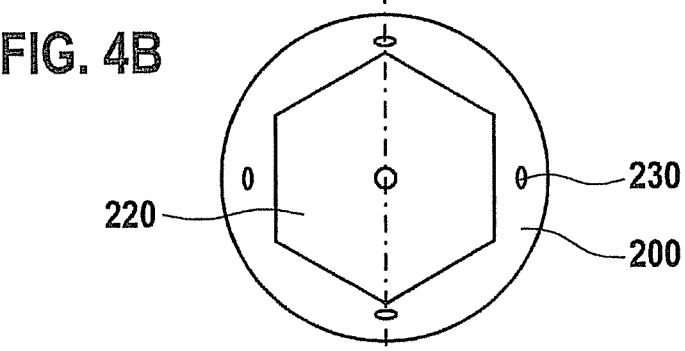

FIG. 4a shows a cross section of another specific embodiment of prechamber module 200 according to the present invention, the prechamber module having an external thread 210 for screwing into laser spark plug 100 according to the present invention. Simple handling and installation result from an entrainment profile which is situated in end region 200a of the laser spark plug facing the combustion chamber, and which in the present case is designed as a hexagonal profile 220. Hexagonal profile 220 is particularly apparent in the top view according to FIG. 4b.

Figure 5:
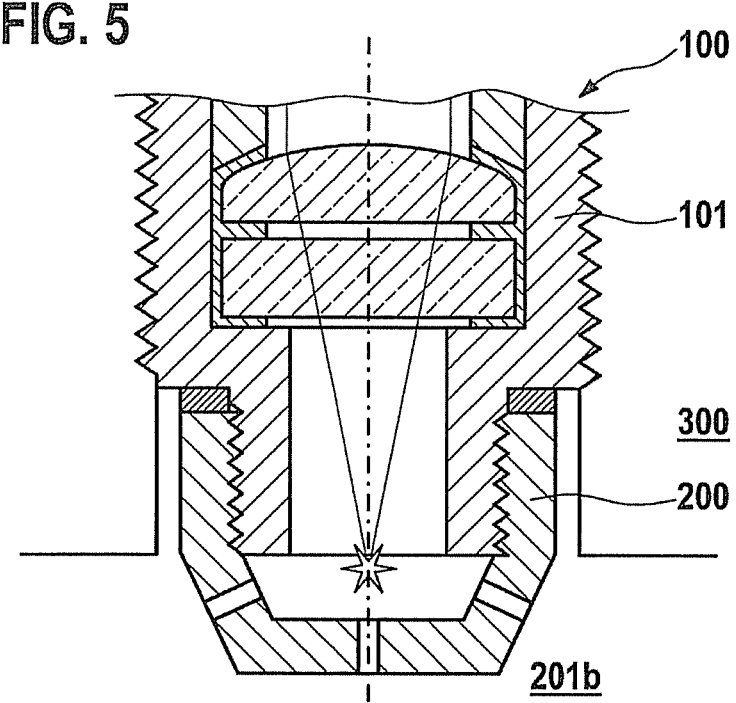
FIG. 5 shows a partial cross section of another specific embodiment of the laser spark plug according to the present invention, together with a prechamber module.

FIG. 5 shows another variant of laser spark plug 100 according to the present invention, in which prechamber module 200 is designed as a union connection, and accordingly is screwed onto an external thread provided on laser spark plug 100. Laser spark plug 100 itself, as is likewise apparent from FIG. 5, is screwed into cylinder head 300 in such a way that only a small portion of the volume of prechamber module 200 protrudes into combustion chamber 201b.

In the configuration illustrated in FIG. 5, prechamber systems in particular may be implemented which have a relatively small prechamber volume.

Figure 6:
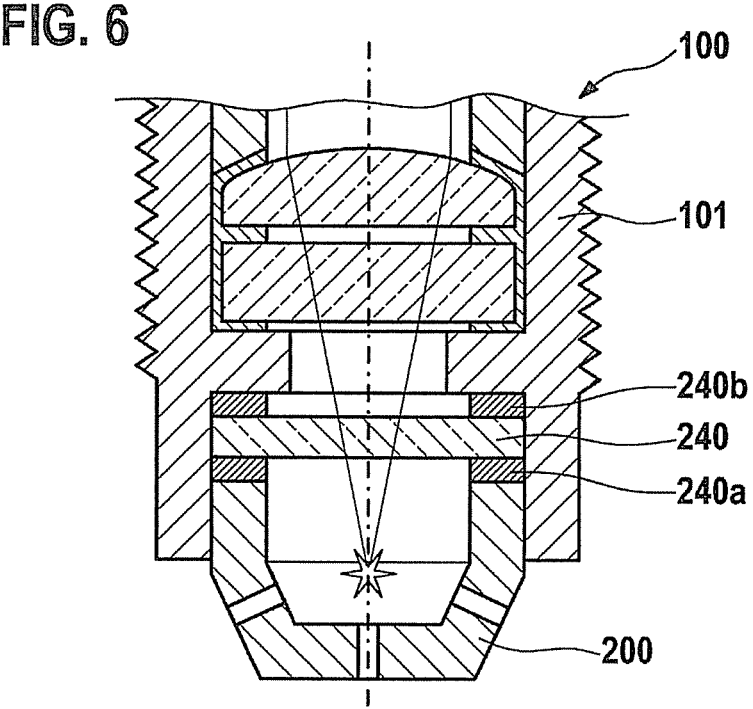
FIG. 6 shows another specific embodiment of the present invention in which the prechamber module is used at the same time for fixing an optical component in the beam path of the laser spark plug.

FIG. 6 shows another variant of the present invention in which an optical component 240, in the present case a combustion chamber window, is situated between prechamber module 200 and laser spark plug 100. In addition to implementing the prechamber, prechamber module 200 is also used for mechanically fixing combustion chamber window 240 in the beam path of laser spark plug 100. In addition, a sealing arrangement 240a, 240b, for example sealing rings, may be provided between combustion chamber window 240 and components 100, 200.

In the design of connection arrangement 110 according to the present invention as a screw connection, by virtue of the screw-in depth of prechamber module 200 into laser spark plug 100 the available prechamber volume may be adjusted within certain limits, as well as the position of ignition site ZO relative to prechamber module 200.

In another particularly advantageous specific embodiment, laser spark plug 100 according to the present invention is configured in such a way that, as illustrated in FIG. 1, ignition site ZO is located in interior 201a of end region 200a of prechamber module 200 facing the combustion chamber, i.e., directly in the region of overflow passages 230. In this way, virtually the entire prechamber volume may be efficiently combusted without an excessively large portion of the not yet combusted mixture being discharged through overflow passages 230 into combustion chamber 201b.

Furthermore, it is particularly advantageous when ignition site ZO is selected in such a way that intense flow or turbulence does not occur in the region of the ignition site, thus allowing an ideally spherical flame core which forms during the ignition to develop without interference, thus allowing also very lean mixtures as used in large gas engines to be reliably ignited. In this case, at the same time ignition may be carried out using less laser energy, thus further reducing the complexity and costs for the laser ignition. One preferred ignition site ZO is situated in the region of the longitudinal axis of laser spark plug 100. The flow conditions in the region of ignition site ZO may be advantageously influenced by an appropriate configuration and quantity of overflow passages 230.

What is claimed is:

1. A laser spark plug for an internal combustion engine of a motor vehicle, the laser spark plug having a first integrated optical component and having a connection arrangement in an end region of the laser spark plug facing a combustion chamber, the connection arrangement configured so that the laser spark plug can be connected to a prechamber module having a second integrated optical component.

2. The laser spark plug as recited in claim 1, wherein the connection arrangement is configured to allow a detachable connection of the laser spark plug to the prechamber module.

3. The laser spark plug as recited in claim 1, wherein the connection arrangement is configured in such a way that allows at least one of a screw connection, a press fit, and a snap-on connection of the laser spark plug, to the prechamber module.

4. The laser spark plug as recited in claim 3, wherein the connection arrangement has a tubular fixing section which extends coaxially to a longitudinal axis of the laser spark plug and which is designed as one piece with a housing of the laser spark plug.

5. The laser spark plug as recited in claim 4, wherein the fixing section has one of at least an internal thread, and an external thread.

6. A prechamber module for a laser spark plug with a first integrated optical component, the prechamber module having a second integrated optical component and having a connection arrangement configured to cooperate with a connection arrangement of the laser spark plug.

7. The prechamber module as recited in claim 6, wherein the connection arrangement of the prechamber module has at least one of an external thread and an internal thread.

8. The prechamber module as recited in claim 6, wherein the prechamber module contains a material having high thermal conductivity, the material being at least one of brass, and a composite material which contains copper and steel.

9. The prechamber module as recited in claim 6, wherein the prechamber module has a hexagonal entrainment profile, provided on an exterior.

10. The prechamber module as recited in claim 9, wherein the entrainment profile is situated in an end region of the prechamber module facing a combustion chamber.

11. The prechamber module as recited in claim 6, wherein the prechamber module has at least one overflow passage which allows a fluid connection between an inner region and an outer region of the prechamber module.

12. The prechamber module as recited in claim 6, further comprising:
    an integrated optical component, the integrated optical component being a combustion chamber window.

13. A laser spark plug arrangement for an internal combustion engine of a motor vehicle, comprising:
    a laser spark plug having a first integrated optical component and having a connection arrangement in an end region facing a combustion chamber; and
    a prechamber module, having a second integrated optical component and having a connection arrangement, wherein the connection arrangement of the laser spark plug is configured to cooperate with the connection arrangement of the prechamber module to connect the laser spark plug to the prechamber module.

14. The laser spark plug arrangement as recited in claim 13, wherein at least one optical component is situated in a region between the prechamber module and the end region of the laser spark plug facing the combustion chamber, and is fixable with respect to the laser spark plug with the aid of the prechamber module.

15. The laser spark plug as recited in claim 1, wherein the laser spark plug has a second connection arrangement configured so that the laser spark plug can be connected to a cylinder head.

16. The laser spark plug arrangement as recited in claim 13, wherein the laser spark plug has a second connection arrangement configured so that the laser spark plug can be connected to a cylinder head.

17. A laser spark plug for an internal combustion engine of a motor vehicle having a combustion chamber window and a prechamber module having an integrated optical component, wherein
    a first connection arrangement, which allows a detachable connection of the laser spark plug to the prechamber module, and a second connection arrangement, which allows a connection of the laser spark plug to the cylinder head, are provided for the laser spark plug, the first connection arrangement, in an end region of the laser spark plug facing the combustion chamber, being situated on the combustion chamber side of the combustion chamber window.

18. The laser spark plug as recited in claim 17, wherein the first connection arrangement is configured in such a way that allows at least one of a screw connection, a press fit, and a snap-on connection of the laser spark plug, to the prechamber module.

19. The laser spark plug as recited in claim 18, wherein the first connection arrangement has a tubular fixing section which extends coaxially to a longitudinal axis of the laser spark plug and which is designed as one piece with a housing of the laser spark plug.

20. The laser spark plug as recited in claim 19, wherein the fixing section has one of at least an internal thread, and an external thread.

* * * * *